US012773778B2

(12) United States Patent
Yoshino

(10) Patent No.: US 12,773,778 B2
(45) Date of Patent: Oct. 27, 2026

(54) ROBOT SYSTEM, TEACH PENDANT, AND PROGRAM

(71) Applicant: FANUC CORPORATION, Yamanashi (JP)

(72) Inventor: Kiyoshi Yoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 50 days.

(21) Appl. No.: 18/855,641

(22) PCT Filed: Apr. 20, 2022

(86) PCT No.: PCT/JP2022/018323

§ 371 (c)(1),
(2) Date: Oct. 10, 2024

(87) PCT Pub. No.: WO2023/203694

PCT Pub. Date: Oct. 26, 2023

(65) Prior Publication Data

US 2025/0249578 A1 Aug. 7, 2025

(51) Int. Cl.

*B25J 9/16* (2006.01)
*B25J 13/06* (2006.01)
*G05B 19/409* (2006.01)
*G06F 7/20* (2006.01)

(Continued)

(52) U.S. Cl.

CPC ............... *B25J 9/163* (2013.01); *B25J 13/06* (2013.01); *G05B 19/409* (2013.01); *G06F 7/20* (2013.01); *G06F 11/3604* (2013.01); *G06F 16/26* (2019.01); *G05B 2219/50104* (2013.01)

(58) Field of Classification Search

CPC ......... B25J 9/163; B25J 13/06; G05B 19/409; G05B 2219/50104; G06F 11/3604; G06F 7/20; G06F 16/26; G06F 16/128; G06F 16/51

See application file for complete search history.

(56) References Cited

U.S. PATENT DOCUMENTS 10,831,991 B1 * 11/2020 Hansen .................. G06F 40/14
2006/0293785 A1 * 12/2006 Ideda ................ G05B 19/0426 700/245

(Continued)

FOREIGN PATENT DOCUMENTS

JP 2017-177258 A 10/2017
JP 2020-082273 A 6/2020

*Primary Examiner* — Jason Holloway
*Assistant Examiner* — Benjamin J Brosh
(74) *Attorney, Agent, or Firm* — HAUPTMAN HAM, LLP

(57) ABSTRACT

A robot system according to one aspect of the present disclosure includes a robot apparatus, a controller that controls the robot apparatus, and a teach pendant connected to the controller. The controller includes a storage unit configured to store information relating to control of a robot and a generation unit configured to generate data relating to an information screen for showing the stored information. The teach pendant includes a display unit configured to display the information screen, a saving unit configured to save the displayed information screen as an image data file in association of a save date and time, and a comparison unit configured to compare two image data files having different save dates and times.

7 Claims, 17 Drawing Sheets

(51) Int. Cl.
*G06F 11/3604* (2025.01)
*G06F 16/26* (2019.01)

(56) References Cited

U.S. PATENT DOCUMENTS

| | | | | |
|---|---|---|---|---|
| 2010/0305758 | A1* | 12/2010 | Nishi | G05B 19/409<br>318/568.14 |
| 2011/0243459 | A1* | 10/2011 | Deng | G06T 7/32<br>382/218 |
| 2015/0251317 | A1* | 9/2015 | Matsukuma | B25J 13/08<br>901/47 |
| 2015/0347284 | A1* | 12/2015 | Hey | H04L 69/40<br>717/125 |
| 2020/0167886 | A1* | 5/2020 | Cho | G06T 1/0014 |
| 2022/0027340 | A1* | 1/2022 | Abdoun | G06F 16/958 |
| 2022/0100378 | A1* | 3/2022 | Borate | G06F 21/568 |

* cited by examiner

ROBOT SYSTEM, TEACH PENDANT, AND PROGRAM

RELATED APPLICATIONS

The present application is a National Phase of International Application No. PCT/JP2022/018323 filed Apr. 20, 2022.

This disclosure relates to a robot system, a teach pendant, and a program.

BACKGROUND ART

A technique for saving, in an external storage device, a backup file of a robot controller that controls a robot apparatus is known (for example, Patent Literature 1). In the backup of the robot controller, setting information relating to the robot apparatus, setting information relating to network communication with other apparatuses, and various types of information relating to control of the robot apparatus such as a program of the robot apparatus are saved as a backup file in a binary format or a text format. Since the backup file is an electronic file, a copy thereof can be saved in an external storage device such as a USB memory stick or a network server. Even if information relating to control of the robot apparatus is lost due to a failure or an erroneous operation of the robot controller, the backup file can be used to restore the state of the robot controller to the state at the time when the backup file was created. Therefore, in recent years when the amount of information handled has increased, the backup has become an important mechanism.

However, backup does not save all data held by the robot controller (hereinafter simply referred to as a controller), and some information is not included in the backup file, for example, information that is temporarily stored in memory, such as cache files, or highly secure information, such as passwords; therefore, even if the state of the software of the controller is restored with a backup file, the restored state of the software may not be completely identical to the state at the time when the backup file was created. Therefore, it is necessary for the operator to check whether the state of the software restored using the backup file is identical to the state at the time when the backup file was created. For example, in the case of control software for robot apparatuses, the operator can visually check all the screens displayed on the teach pendant by the control software to grasp the state of the control software after restoration. However, since the amount of information handled by control software for robot apparatuses is large and the number of pages displayed on the teach pendant by the control software is enormous, it is impractical to visually check all the screens, and even if they are visually checked, it is difficult to determine whether or not the state after restoration is back to the state at the time when the backup file was created. Therefore, it is desired to assist the operator in checking whether or not the state of control software restored using a backup file is back to the state at the time when the backup file was created.

CITATION LIST

Patent Literature

Patent Literature 1: Japanese Unexamined Patent Application Publication No. 2017-177258

DETAILED DESCRIPTION OF THE INVENTION

Figure 1:
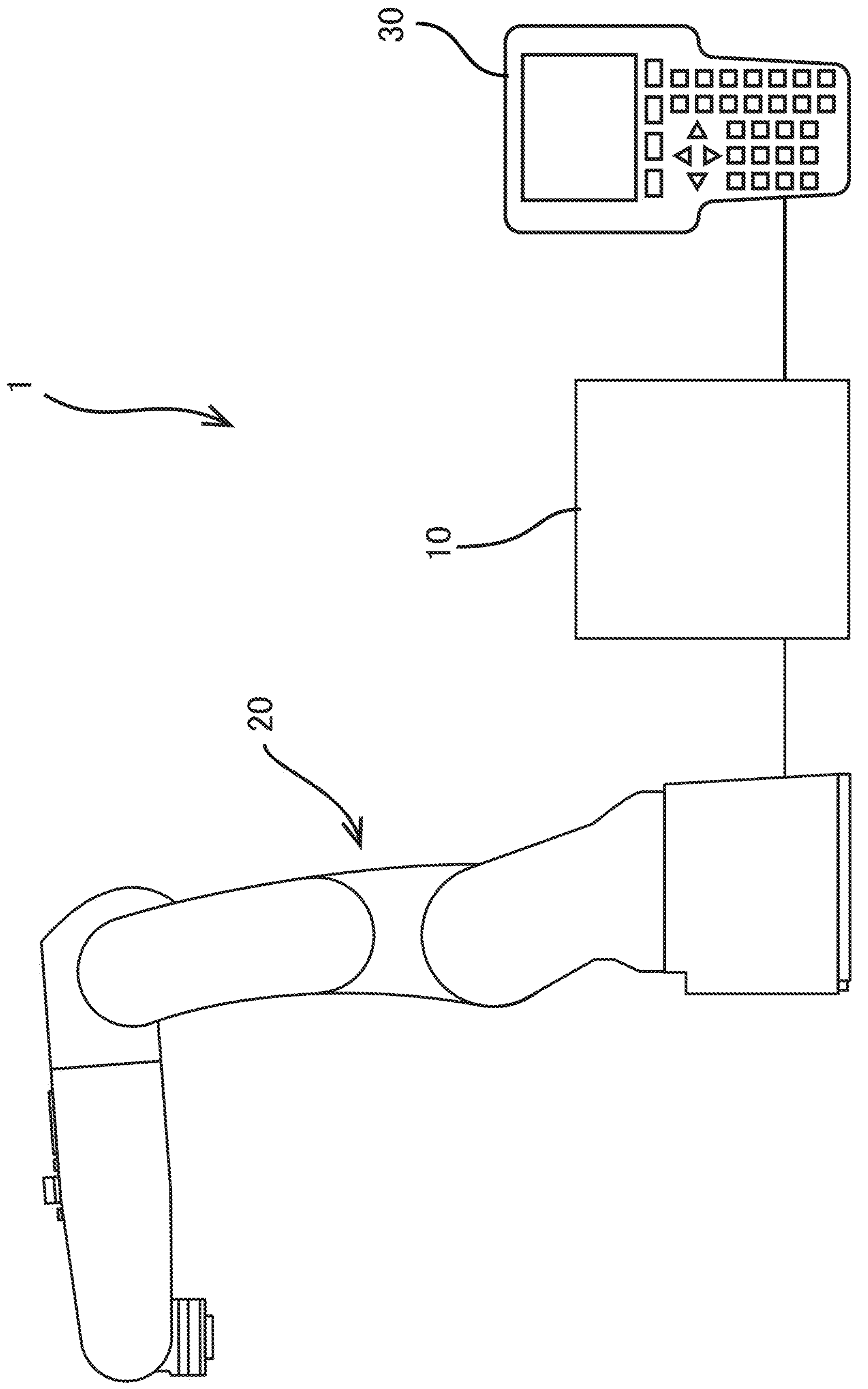
FIG. 1 shows an example of a robot system according to a first embodiment.

A robot system according to an aspect of the present disclosure includes a robot, a controller that controls the robot, and a teach pendant connected to the controller. The controller includes means for storing information relating to control of the robot and means for generating data relating to an information screen for displaying the stored information. The teach pendant includes display means for displaying the information screen, means for saving the displayed information screen as an image data file in association of a save date and time, and comparison means for comparing two image data files having different save dates and times.

Hereinafter, a robot system according to the present embodiment will be described with reference to the drawings. In the following description, constituent elements having substantially the same function and configuration are denoted by the same reference numeral, and repetitive descriptions will be given only where necessary.

In the present embodiment, when an information screen for controlling a robot apparatus, which is provided by control software for the robot apparatus, is restored by a backup file, the operator is assisted in checking whether the information screen after the restoration is back to the state at a predetermined point in time before the restoration. In the first embodiment, an example in which the information screen is provided by a web page will be described.

First Embodiment

As shown in FIG. 1, a robot system 1 according to the first embodiment includes a robot apparatus 20, a controller 10 that controls the robot apparatus 20, and a teach pendant 30 connected to the controller 10.

Figure 2:
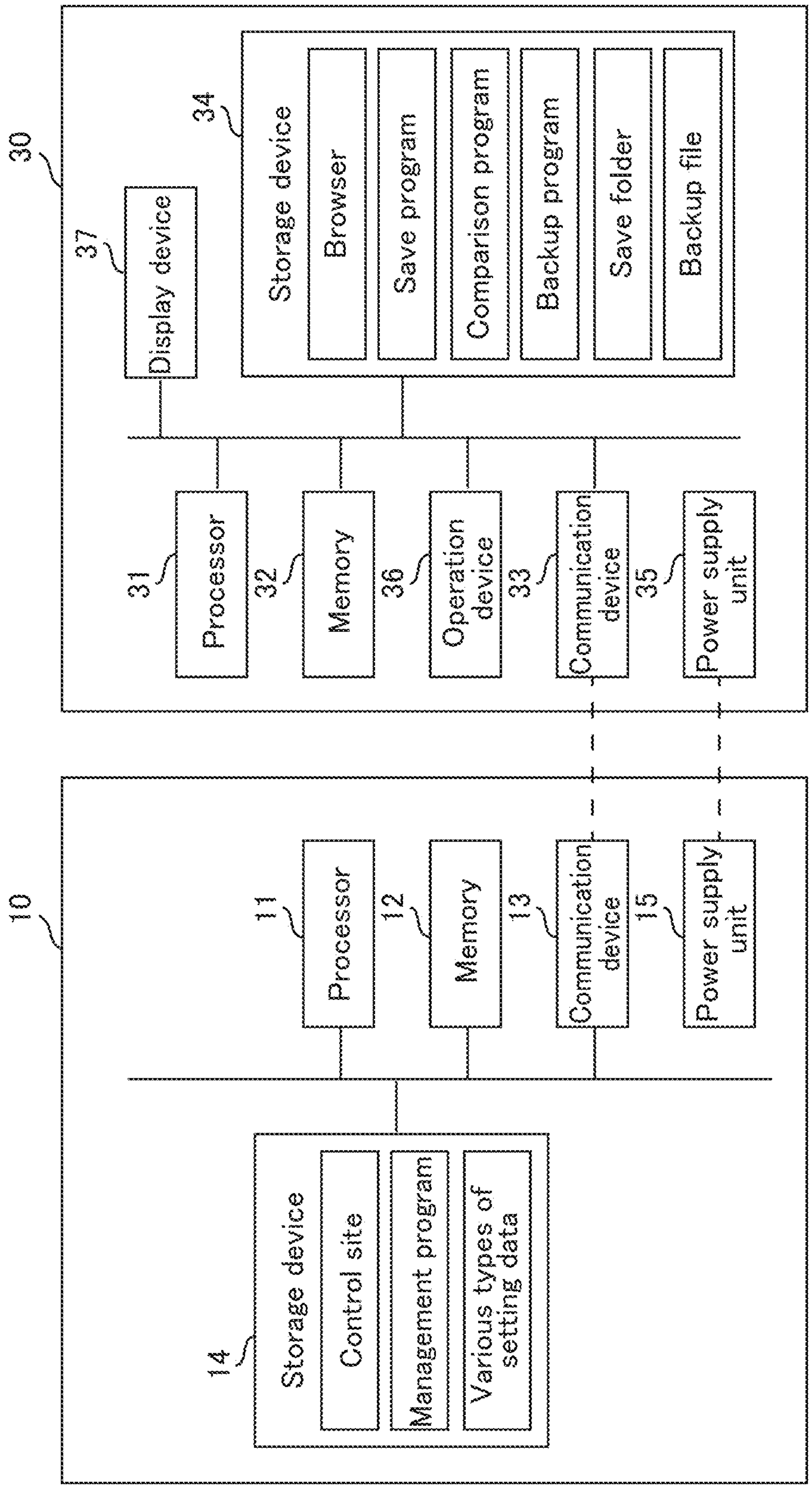
FIG. 2 is a configuration diagram of a controller and a teach pendant shown in FIG. 1.

As shown in FIG. 2, the controller 10 is a calculation apparatus in which a memory 12, a communication device 13, a storage device 14, and the like are connected to a processor 11 such as a CPU via a data/control bus. In addition, the controller 10 also includes a power supply unit 15 that supplies power to the teach pendant 30 connected to the controller 10 by wire or wirelessly. The processor 11 performs overall control of the controller 10. The memory 12 functions as a workspace for the processor 11. The communication device 13 transmits and receives various types of information to and from the teach pendant 30.

The storage device 14 includes an HDD, an SSD, and the like. The storage device 14 stores various types of information relating to control of the robot apparatus 20. The various types of information include information relating to a web site for controlling the robot apparatus 20 (hereinafter simply referred to as a control site) and various types of setting data input by the user through the web site. The information relating to the control site includes data of a plurality of html files corresponding to a plurality of web pages constituting the control site, and icon data and image data constituting the web pages, and the like. In addition, the various types of information include an operation program of the robot apparatus 20, setting data relating to the network, setting data relating to I/O, setting data relating to peripheral devices, and the like.

The storage device 14 stores a management program of the control site. When the management program is executed by the processor 11, in response to a request from the teach pendant 30 to obtain a web page, the controller 10 reads an html file corresponding to the requested web page, writes various types of setting data stored in the storage device 14 in the read html file, and transmits data of the constructed html file to the teach pendant 30. That is, the controller 10 uses various types of information stored in the storage device 14 to generate data of an information screen for displaying the various types of information.

Figure 3:
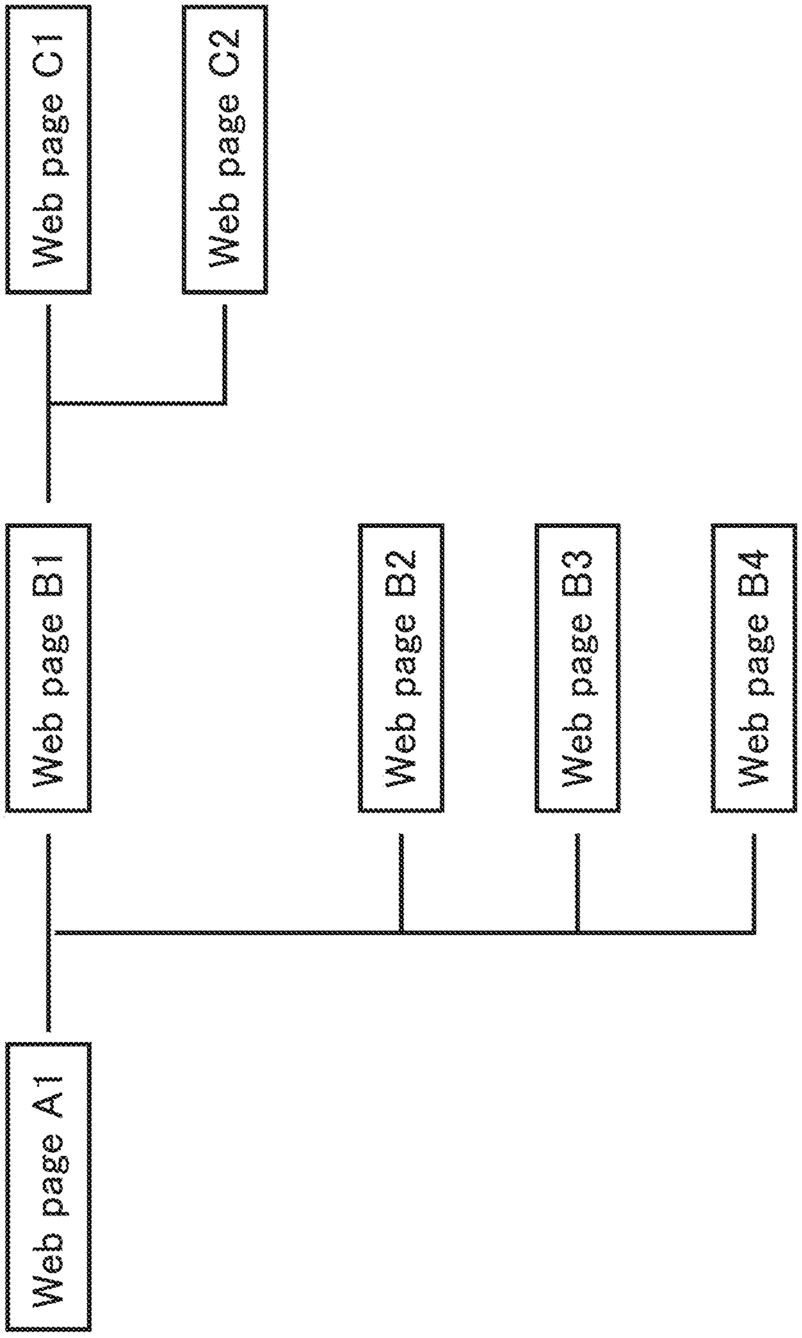
FIG. 3 shows a hierarchical structure of a control site saved in the controller shown in FIG. 1.
Figure 4:
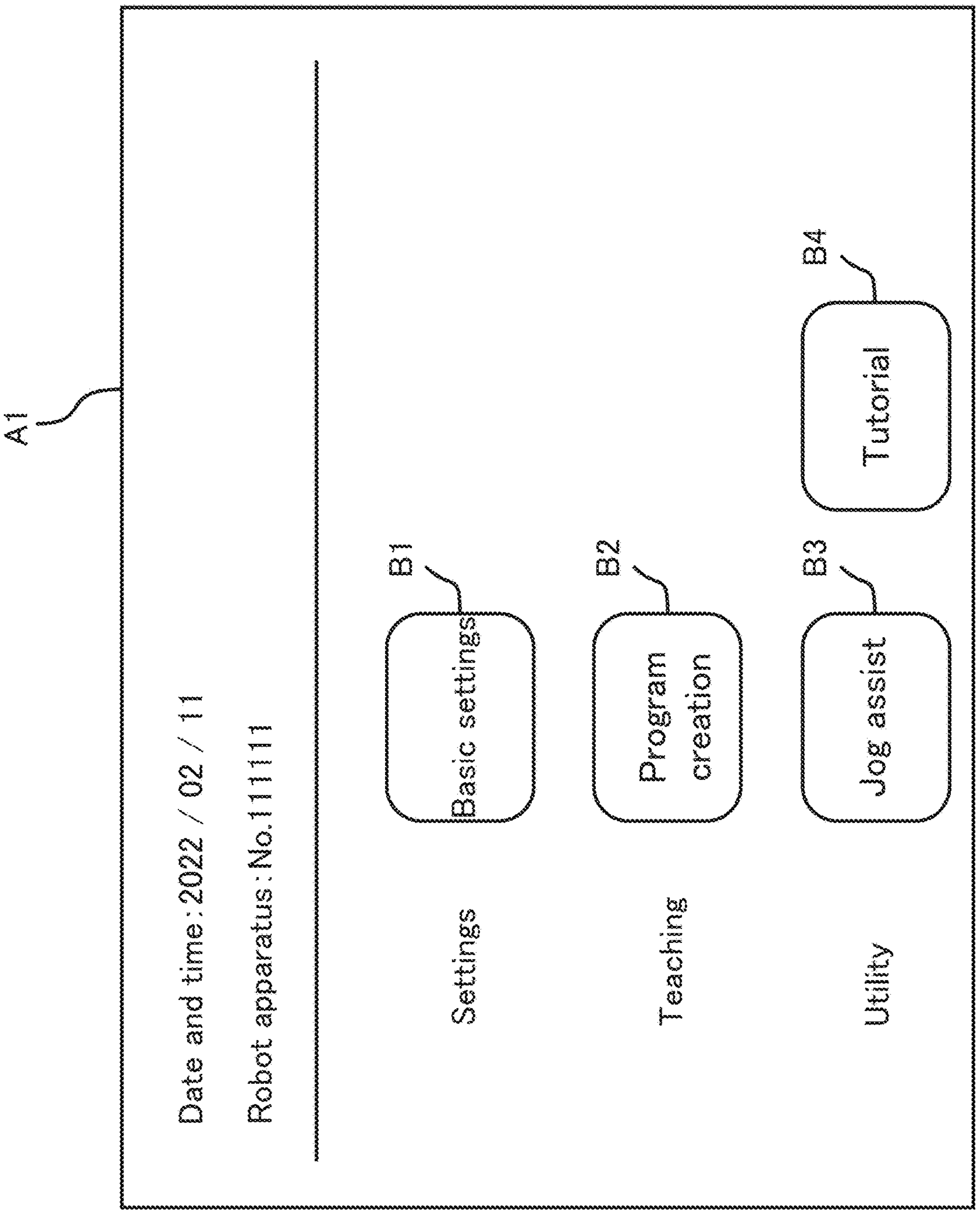
FIG. 4 shows a state in which a web page A1 in FIG. 3 is displayed on the teach pendant.
Figure 5:
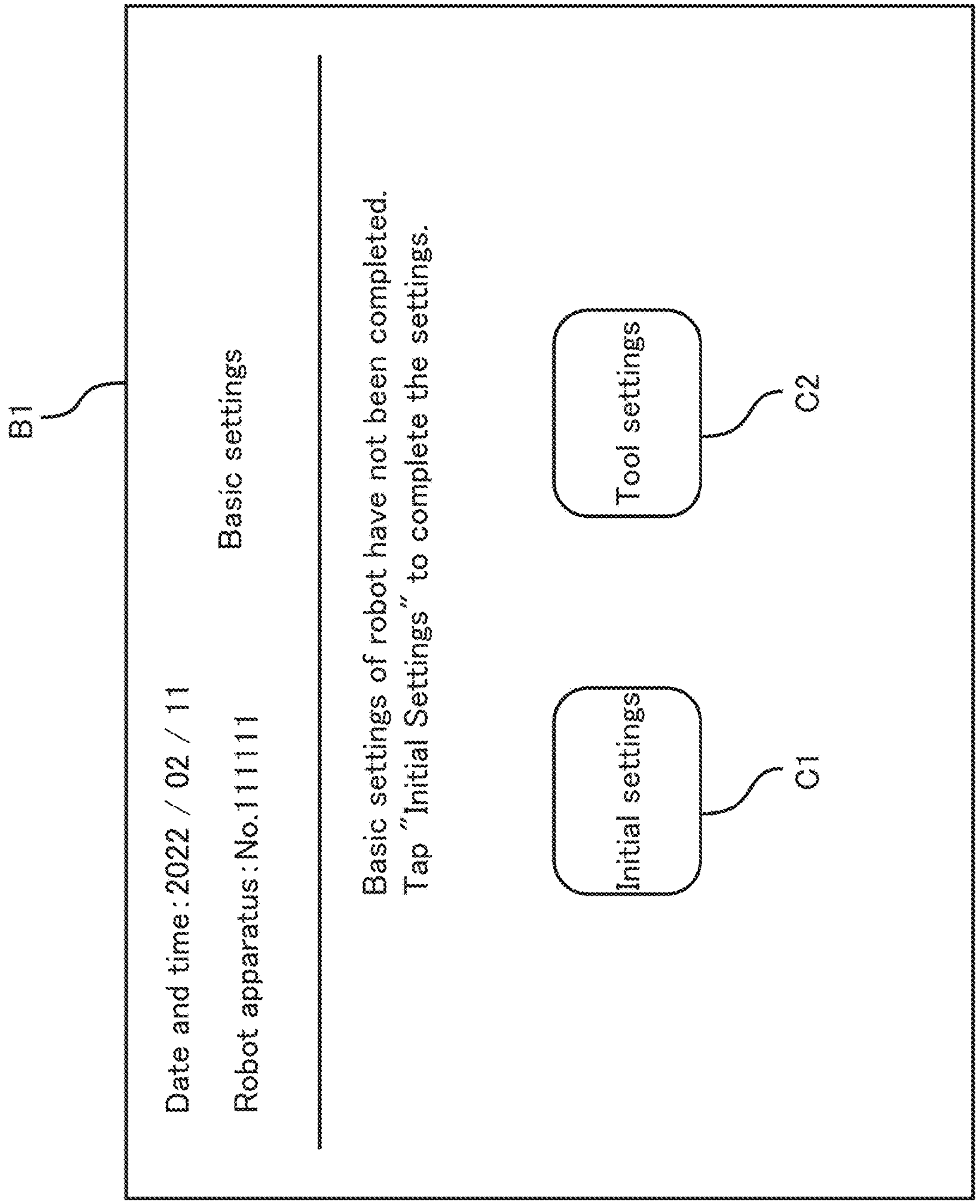
FIG. 5 shows a state in which a web page B1 in FIG. 3 is displayed on the teach pendant.

The control site is composed of a plurality of web pages forming a tree structure. As shown in FIG. 3, for example, it is assumed that the control site has a three-tier structure and includes a web page A1 in the first tier, web pages B1, B2, B3, and B4 in the second tier, and web pages C1 and C2 in the third tier. The web page A1 corresponding to the first tier is also referred to as a top page. As shown in FIG. 4, the top page A1 shows four buttons B1, B2, B3, and B4, which are linked to four web pages B1, B2, B3, and B4, respectively. That is, the html file corresponding to the top page A1 contains four hyperlink tags, which are commands to transition to web pages B1, B2, B3, and B4, respectively. The four hyperlinks refer to four URLs, respectively. As shown in FIG. 5, the web page B1 in the second tier shows two buttons C1 and C2, which are linked to two web pages C1 and C2, respectively. That is, the html file corresponding to the web page B1 contains two hyperlink tags corresponding to web pages C1 and C2, respectively. The two hyperlinks refer to two URLs, respectively. In this manner, all the web pages A1, B1, B2, B3, B4, C1, and C2 constituting the control site can be identified by following the links included in the pages constituting the control site.

As shown in FIG. 2, the teach pendant 30 is a calculation device in which a memory 32, a communication device 33, a storage device 34, an operation device 36, a display device 37, and the like are connected to a processor 31 such as a CPU via a data/control bus. Typically, the teach pendant 30 is an apparatus designed exclusively for the controller, and includes a power supply unit 35 that receives power supply from the controller 10 connected by wire.

The processor 31 performs overall control of the controller 10. The memory 32 functions as a workspace for the processor 31. The communication device 33 transmits and receives various types of information to and from the teach pendant 30.

The operation device 36 includes a button, a switch, a jog, or the like. Note that the teach pendant 30 may include a touch panel or the like that serves as both the operation device 36 and the display device 37. The operator can input various types of information to the teach pendant 30 by operating the operation device 36.

The display device 37 includes an LCD or the like. The display device 37 displays various pages relating to control of the robot apparatus 20. The html files that serve as the sources of the various pages are provided by the controller 10.

The storage device 34 includes an HDD, an SSD, or the like. The storage device 34 stores therein a browser, a save program, a comparison program, a backup program, and the like. Of course, the save program and the comparison program may be described in a single program, rather than being separated. The browser stored in the storage device 34 is executed by the processor 31, allowing the teach pendant 30 to parse html files and display web pages. The save program stored in the storage device 34 is executed by the processor 31, allowing the teach pendant 30 to execute a screen saving process to be described later. A save folder generated by the screen saving process is stored in the storage device 34. The comparison program stored in the storage device 34 is executed by the processor 31, allowing the teach pendant 30 to execute a comparison process to be described later. The backup program stored in the storage device 34 is executed by the processor 31, allowing the teach pendant 30 to create a backup file, which is a collection of various types of data constituting the control site managed by the controller 10. The created backup file is stored in the storage device 34.

Figure 7:
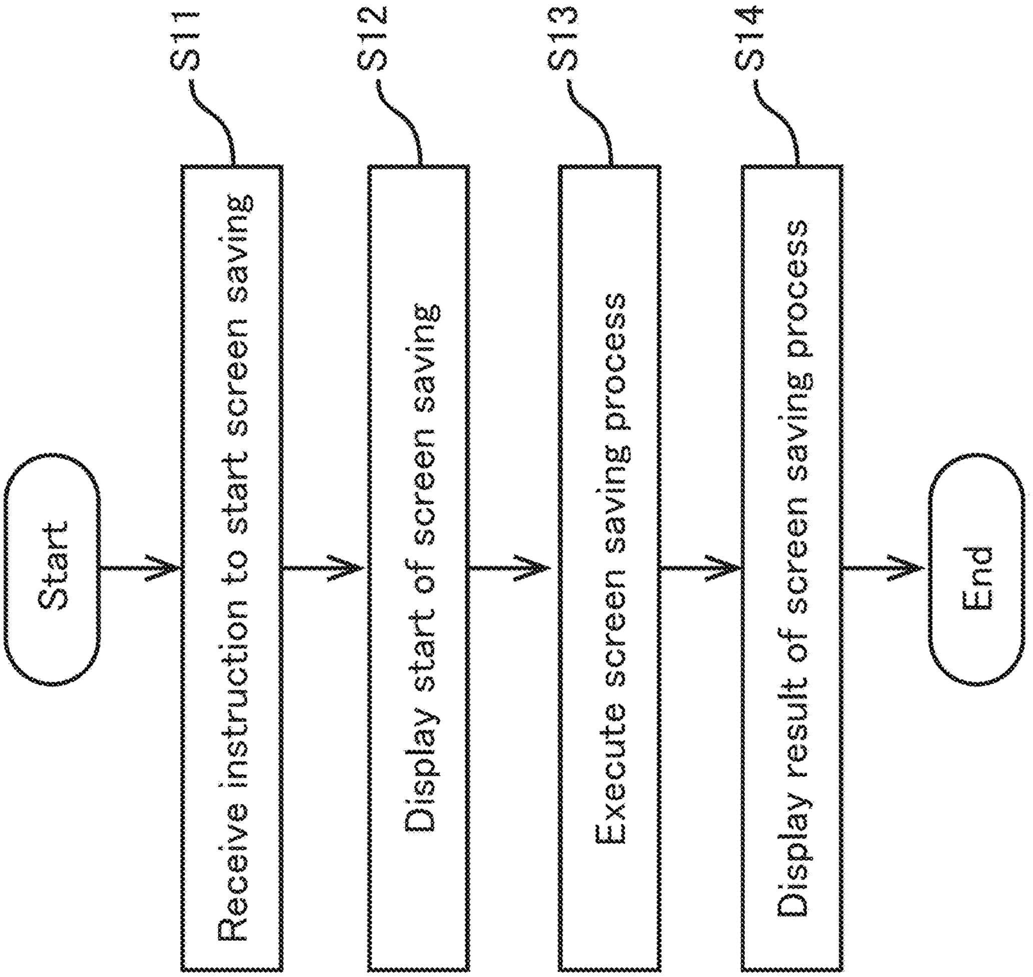
FIG. 7 is a flowchart showing a general procedure of a screen saving process executed in the teach pendant shown in FIG. 1.

The screen saving process of the control site by the teach pendant 30 will be described below with reference to FIG. 7 and FIG. 8. As shown in FIG. 7, when the teach pendant 30 receives an instruction to start the screen saving process from the operator (S11), the teach pendant 30 displays a screen for notifying the operator of the start of the screen saving process (S12) and executes the screen saving process shown in FIG. 8 (S13). When the screen saving process is completed, a screen for notifying the operator of the completion of the screen saving process is displayed (S14), and all steps of the screen saving process are completed.

Figure 8:
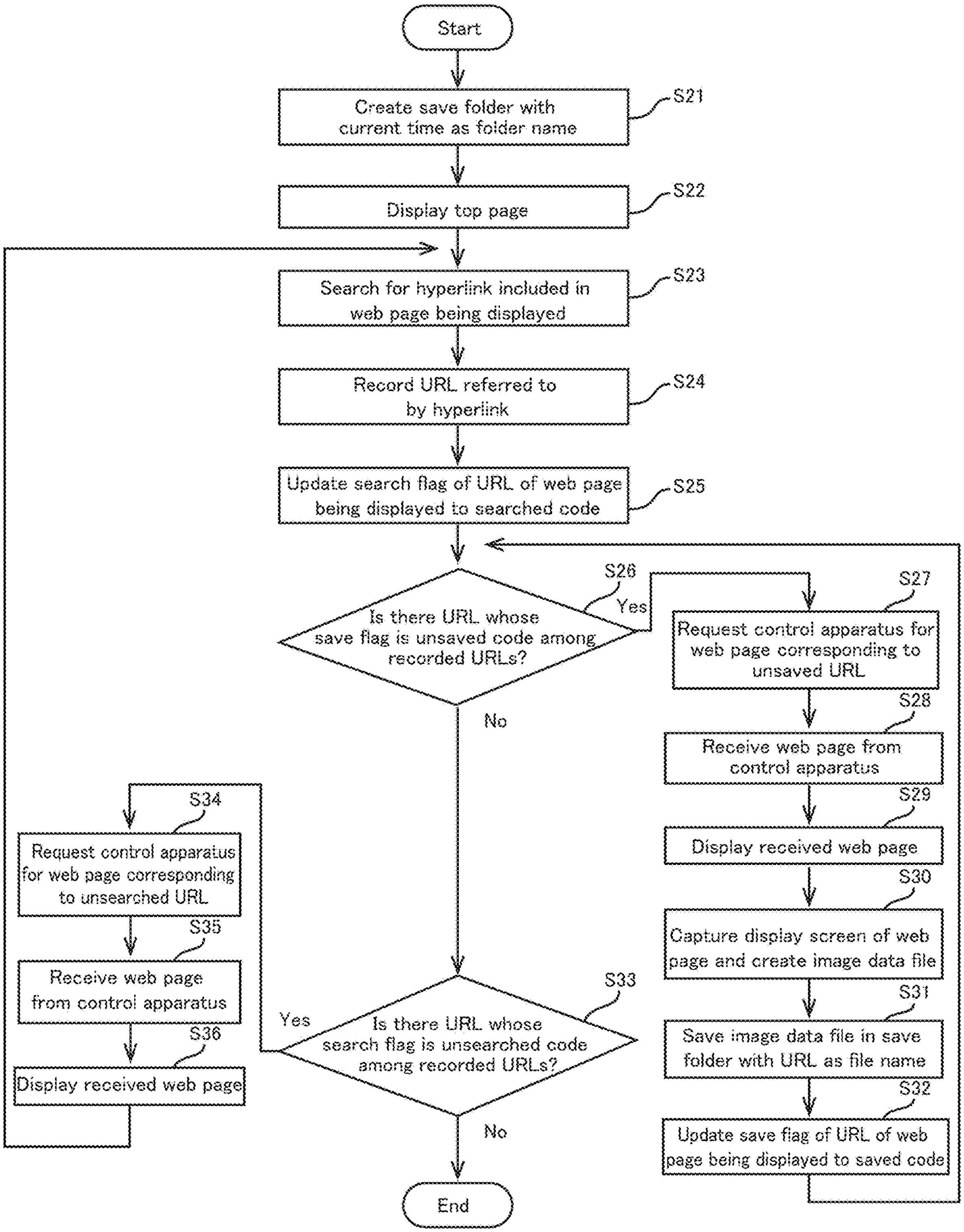
FIG. 8 is a flowchart showing a detailed procedure of the screen saving process shown in FIG. 7.

As shown in FIG. 8, when the screen saving process is started, the teach pendant 30 creates a folder (save folder) in which the image data file is saved (S21), requests the controller 10 for the html file corresponding to the top page of the control site, parses the html file received from the controller 10, and displays the top page (S22). Typically, the save folder is associated with a save date and time, and stored in the teach pendant 30. The folder name of the save folder is initially set to the time when the screen saving process was executed (save date and time) so that the date and time when the screen saving process was executed can be confirmed at a glance. The save folder is saved in a folder provided for each robot apparatus 20 to be controlled.

Next, the teach pendant 30 searches for a hyperlink included in the web page being displayed (S23). For example, the hyperlink can be identified by a hyperlink tag described in the html file corresponding to the web page being displayed. The teach pendant 30 records the URL referred to by the hyperlink identified in step S23 (S24). The URL recorded in step S24 is accompanied by a save flag for identifying whether or not a screen image of the web page corresponding to the URL has been saved as an image data file, and a search flag for identifying whether or not a hyperlink searching process has been executed for the web page corresponding to the URL. The save flag is initially set to an unsaved code, and the search flag is initially set to an unsearched code. When step S24 is completed, the search flag of the URL of the web page being displayed is updated to a searched code indicating that the search has been completed (S25).

Next, the teach pendant 30 saves the image data file of the web page corresponding to the URL recorded in step S24 in the save folder. Specifically, the teach pendant 30 identifies a URL whose save flag is the unsaved code among the URLs recorded in step S24, requests the controller 10 to provide the identified web page (S27), receives the requested web page from the controller 10 (S28), and displays the received web page (S29).

Then, the screen of the web page displayed on the teach pendant 30 is captured, an image data file having a predetermined format such as jpg or bmp is created (S30), and the created image data file is saved in the save folder (S31). Typically, in the process of step S30, the bitmap data of the screen of the teach pendant 30 is saved in the memory, and the saved bitmap data is converted to a predetermined size and converted into an image data file having a predetermined format. Attribute information such as a save date and time is added to the image data file. In the process of step S31, the name of the image data file is initially set to be a URL so that the source web page of the image data file can be identified. The teach pendant 30 updates the save flag of the URL corresponding to the web page being displayed to a saved code (S32).

The processes of steps S27 to S32 are repeatedly executed until the save flags of all the URLs recorded in step S24 are updated to the saved code (S26; Yes). When the save flags of all the URLs recorded in step S24 are updated to the saved code (S26; No), the teach pendant 30 requests the controller 10 to provide a web page corresponding to the URL whose search flag is the unsearched code among the URLs recorded in step S24 (S34), receives the requested web page from the controller 10 (S35), and displays the received web page (S36). Then, the processing returns to step S23, and a process of searching for hyperlinks included in the web page being displayed, a process of recording new URLs referred to by the hyperlinks, a process of capturing the display screens of the web pages corresponding to all the newly recorded URLs, and a process of saving the captured image data files are sequentially executed. The processes of steps S24 to S32 and the processes of steps S34 to S36 are repeatedly executed until the save flags of all the URLs newly recorded in step S24 are updated to the saved code and the search flags are updated to the searched code (S33; Yes). When the save flags of all the URLs recorded in step S24 have been updated to the saved code and the search flags have been updated to the searched code (S33; No), the screen saving process is completed.

By the screen saving process described with reference to FIG. 8, a plurality of image data files corresponding respectively to a plurality of web pages located in the tiers under the top page of the control site can be saved in the save folder.

When the above-described screen saving process is executed for a control site having a hierarchical structure as shown in FIG. 3, the following processing is performed. That is, by the process of step S24 in the first cycle, four URLs corresponding to the four web pages B1, B2, B3, and B4 linked to the top page A1 are recorded. At this point in time, the save flags and the search flags of the four URLs are set to the unsaved code and the unsearched code, respectively. The four web pages B1, B2, B3, and B4 respectively corresponding to the four URLs are sequentially displayed on the teach pendant 30 by the processes of steps S26 to S32 in the first cycle, four image data files respectively corresponding to the displayed four web pages B1, B2, B3, and B4 are saved in the save folder, and the save flags of the four URLs are updated to the saved code.

At this point in time, the search flags of the four URLs are the unsearched code; therefore, the processes of steps S23 to S32 in the second cycle are executed for the web page B1 corresponding to one of the four URLs. Accordingly, the two URLs corresponding to the two web pages C1 and C2 linked to the web page B1 are newly recorded. At this point in time, the total number of recorded URLs is six. Since the save flags of the two newly recorded URLs (web pages C1 and C2) among the six URLs are the unsaved code, the two web pages C1 and C2 respectively corresponding to the two URLs are sequentially displayed on the teach pendant 30, two image data files respectively corresponding to the two displayed web pages C1 and C2 are saved in the save folder, and the save flags of the two URLs are updated to the saved code.

When step S32 in the second cycle is completed, the search flags of the five URLs other than the URL corresponding to the web page B1 among the six recorded URLs are the unsearched code; therefore, the processes of steps S23 to S32 in the third cycle are executed for the web page B2 corresponding to one of the five URLs. Since no hyperlink is set in the web page B2, there is no URL to be newly recorded, and since the save flags of the six URLs already recorded are the saved code, the search flag of the URL corresponding to the web page B2 is updated to the searched code.

When the process of step S32 in the third cycle is completed, the search flags of the four URLs other than the two URLs respectively corresponding to the web pages B1 and B2 among the six recorded URLs are the unsearched code. In the four web pages B3, B4, C1, and C2 respectively corresponding to the four URLs, no hyperlink is set as in the web page B2. Therefore, the same processing as the processing executed for the web page B2 is also executed for the web pages B3, B4, C1, and C2, and as a result, the search flags of the six recorded URLs are updated to the searched code, and the screen saving process is completed. By the screen saving process, a plurality of image data files corresponding to the web pages B1, B2, B3, B4, C1, and C2 located in the tiers under the top page of the control site are saved in the save folder.

The comparison process by the teach pendant 30 will be described below with reference to FIG. 9. A comparison program has a function of comparing two image data files having the same URL and different save dates and times, and displaying two images (screens) unachieved from the two image data files in parallel with the portions with differences in a different display mode, such as shading, filling, or the like, from the display mode of the portions without differences. Details will be described below.

Figure 9:
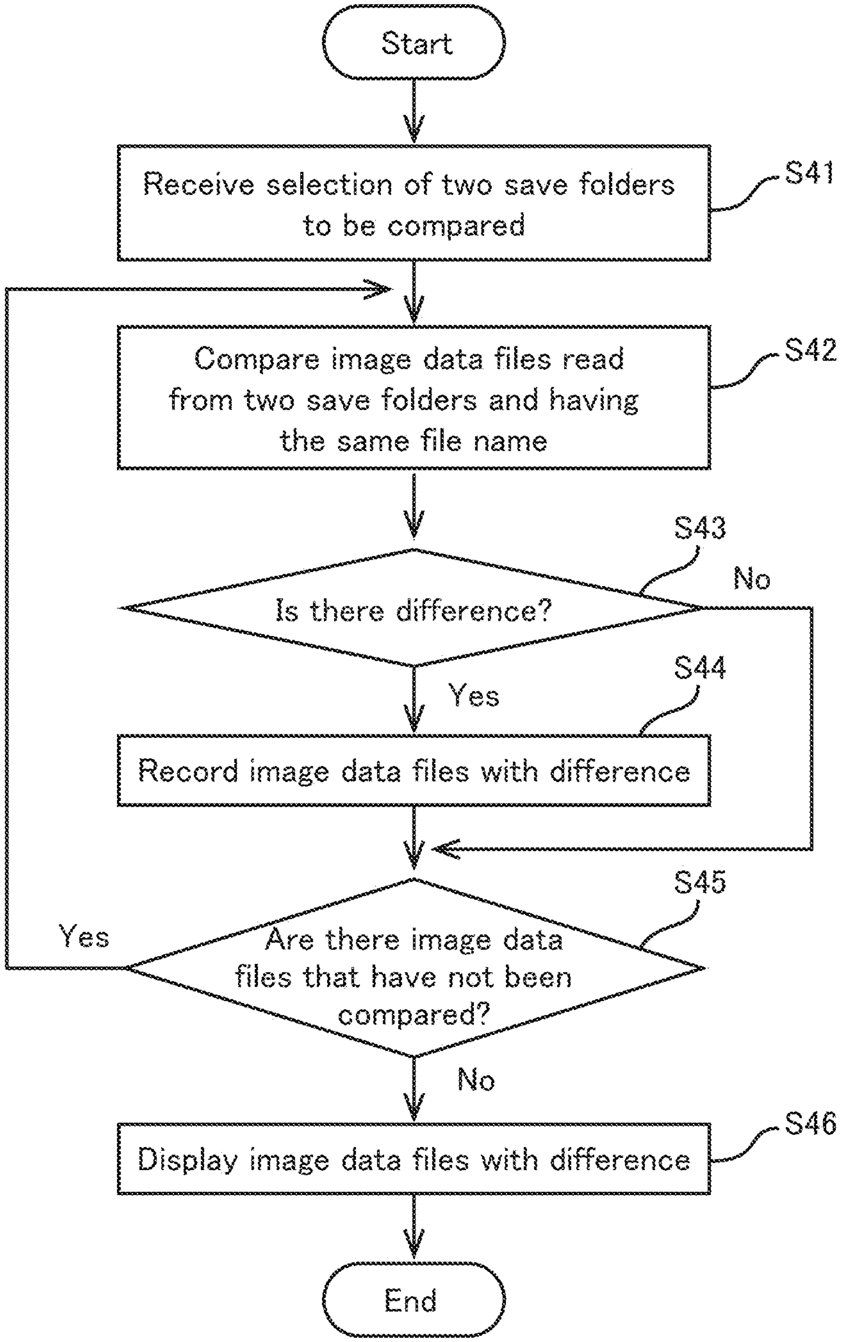
FIG. 9 is a flowchart showing a procedure of a comparison process executed in the teach pendant shown in FIG. 1.

As shown in FIG. 9, the teach pendant 30 receives, from the operator, designation of two save folders having different save dates and times to be compared (S41). Typically, of the two save folders, the save folder having the newer save date and time is the one created by executing the screen saving process for the control site after restoring the control site with the backup file, and the save folder having the older save date and time is the one created by executing the screen saving process for the control site in a normal state.

The teach pendant 30 reads one image data file from the newer save folder among the two received save folders, reads from the older save folder an image data file having the same file name as the image data file read from the newer save folder, and compares the two read image data files (S42). Since the file name is the URL of the source web page of the image data file, two image data files having different save dates and times are compared for the same web page to identify whether there is a difference therebetween by the process of step S42. Any method can be employed as the comparison method. For example, whether there is a difference between the two image data files can be identified based on the pixel values of all the pixels constituting the image data files. When there is a difference between the two image data files (S43; Yes), the file name (URL) of the image data files with a difference is recorded (S44). The processes of step S42 to step S44 are repeatedly executed until the comparison of all the image data files is completed (S45; Yes). When the comparison of all the image data files is completed (S45; No), two image data files between which a difference was recognized as a comparison result are displayed on the teach pendant 30 (S46). Note that when there is a difference in the number of image data files included in the two read save folders, the teach pendant 30 displays this as a comparison result.

Figure 10:
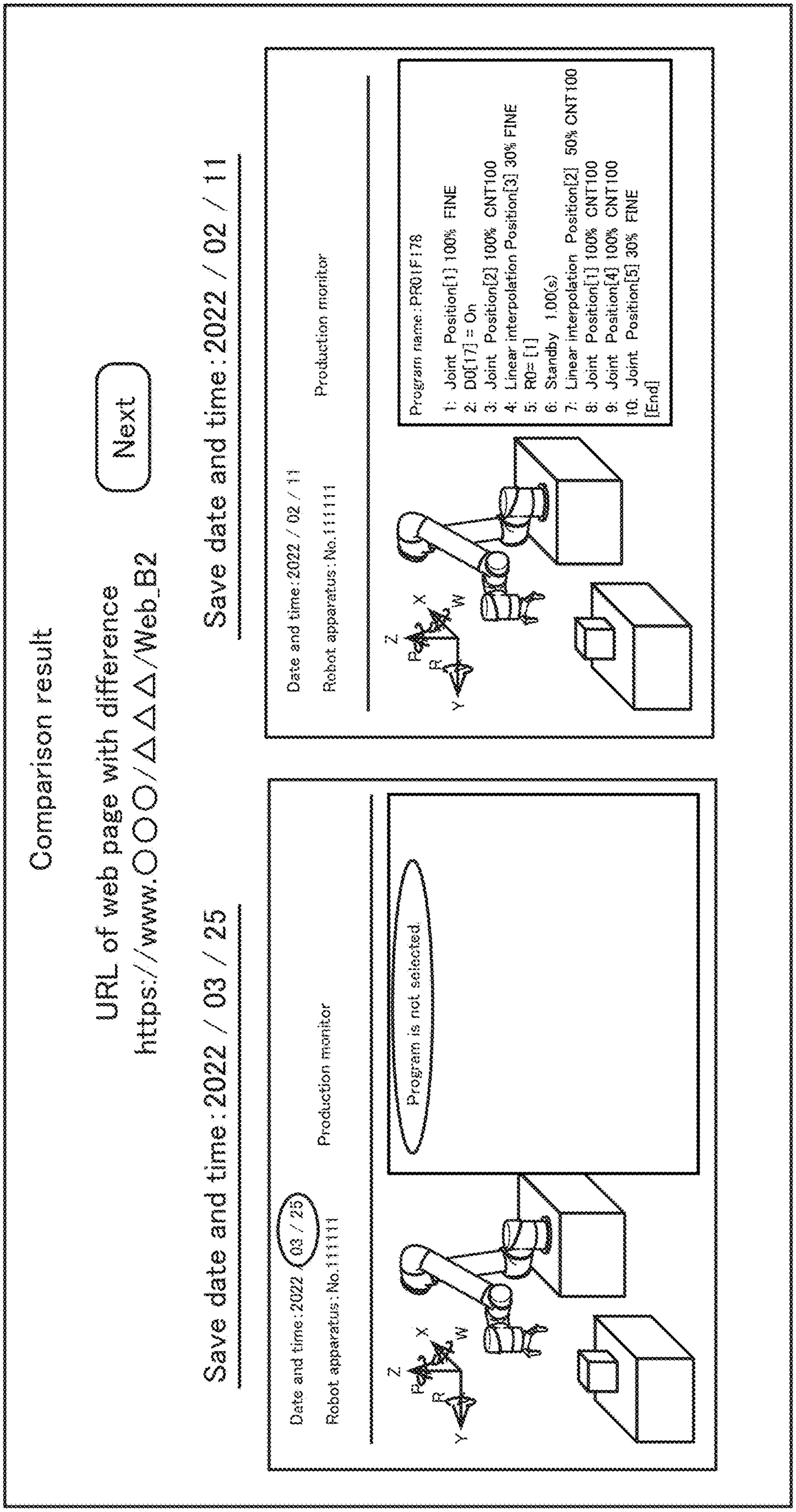
FIG. 10 shows an example of a display screen of a comparison result in the comparison process of FIG. 9.

As shown in FIG. 10, as a comparison result of the comparison process of FIG. 9, the teach pendant 30 displays a URL for which a difference was recognized, and displays side by side two images (screens) unachieved from the two image data files having different save dates and times corresponding to the URL. Of the two image data files, the image having the newer save date and time and the image having the older save date and time are displayed in parallel, and the portions where differences were found are highlighted by shading, filling, or the like in a display mode different from that of the portions where there is no difference. By tapping the 'Next' button, two image data files corresponding to the linked URL and having different save dates and times are unachieved, and two images are displayed in parallel.

The robot system 1 according to the present embodiment has the following effects. That is, the robot system 1 according to the present embodiment is characterized in that an image data file created by capturing the screen of the web page actually displayed on the teach pendant 30 is saved, and that two image data files having different save dates and times, which are saved for web pages having the same URL, are compared.

For example, it is also conceivable to save only the setting values defined as variables in the html files corresponding to the web pages constituting the control site. However, in the case where only two setting values having different save dates and times are compared with each other, even if the setting values match each other, the setting values may not be written in the actual web pages and may not be reflected for some reason. In the robot system 1 according to the present embodiment, since the actually displayed screens are compared with each other, it is possible to simultaneously check whether or not the setting values match each other and whether or not the setting values are reflected on the screens. Therefore, according to the robot system 1 of the present embodiment, it is possible to solve the problem that occurs when only the setting values are saved, and to improve the accuracy of checking by the operator.

Further, the teach pendant 30 can compare two image data files having different save dates and times, which are saved for the web pages having the same URL, and display side by side the two image data files for which a difference was detected so that the range in which the difference was detected can be seen as shown in FIG. 10. The operator can visually check only the two image data files for which the difference was detected to check whether the control site restored by the backup file is back to the state at the time when the backup file was acquired. Even if the operator knows that the restored control site is not back to the state at the time when the backup file was acquired, the operator may use the control site as it is if the difference does not cause any problem in using the web page.

Since two image data files corresponding to the same URL determined to have no difference by the comparison process are not displayed on the teach pendant 30, the number of image data files that must be checked by the operator can be reduced. This reduces the amount of work required for checking by the operator. Further, on the teach pendant 30, as shown in FIG. 10, the portions where differences are recognized in the comparison result are highlighted. This also contributes to further reducing the amount of work required for checking by the operator. On the screen of FIG. 10, the operator can tap the 'Next' button to check two image data files corresponding to the same URL for which a difference was recognized, one after another. This reduces the time required for checking by the operator.

According to the screen saving process of the robot system 1 of the present embodiment, it is possible to search for all the web pages constituting the control site by following the hyperlinks, and save them as image data files of the display screens of all the searched web pages. In the comparison process, the image data file saved after restoration is not compared with the reference image data file saved in advance, but two image data files having different save dates and timed, which are saved by the screen saving process, are compared. Those allow the operator to flexibly deal with situations in which the number of web pages constituting the control site increases or decreases or the URL is changed due to customization or the like.

The teach pendant 30 constituting the robot system 1 according to the present embodiment is an apparatus designed exclusively for the controller 10. However, the teach pendant 30 may be provided by a general-purpose information processing apparatus such as a PC, a tablet, or a smartphone having a calculation function, a communication function, an operation function, and a display function. The teach pendant 30 is a concept including a general-purpose information processing apparatus.

One feature of the present embodiment is that a screen image of an actually displayed web page is saved as an image data file so that screens of two web pages having different save dates and times can be compared. Accordingly, the robot system 1 according to the present embodiment can be applied to other systems. For example, the robot apparatus 20 may be industrial machines, such as a machine tool, an injection molding machine, and other computer numerical control (CNC) controlled machines, and what is saved may be the control site of the industrial machine. The machine tool here includes a cutting machine, an electric discharge machine, a laser machine, an ultra-precision machine, and the like. The CNC controlled machine includes a forging machine, a conveyor, a stocker, a cloth cutter, and the like.

As shown in FIG. 10, the teach pendant 30 can display only two image data files having different save dates and times corresponding to a URL for which a difference was found, by having a function of executing the comparison process. However, from the viewpoint of assisting the operator in checking whether or not the control site restored by the backup is back to the state at a specific point in time in the past, two image data files having different save dates and times corresponding to not only the URL for which a difference was recognized but also all the URLs may be displayed side by side. In other words, the teach pendant 30 does not have to have a function of executing the comparison process. By tapping the 'Next' button displayed on the teach pendant 30, the operator can check one after another whether there is a difference between the two image data files having different save dates and times by switching the URL, thereby reducing the time required for checking by the operator.

Figure 6:
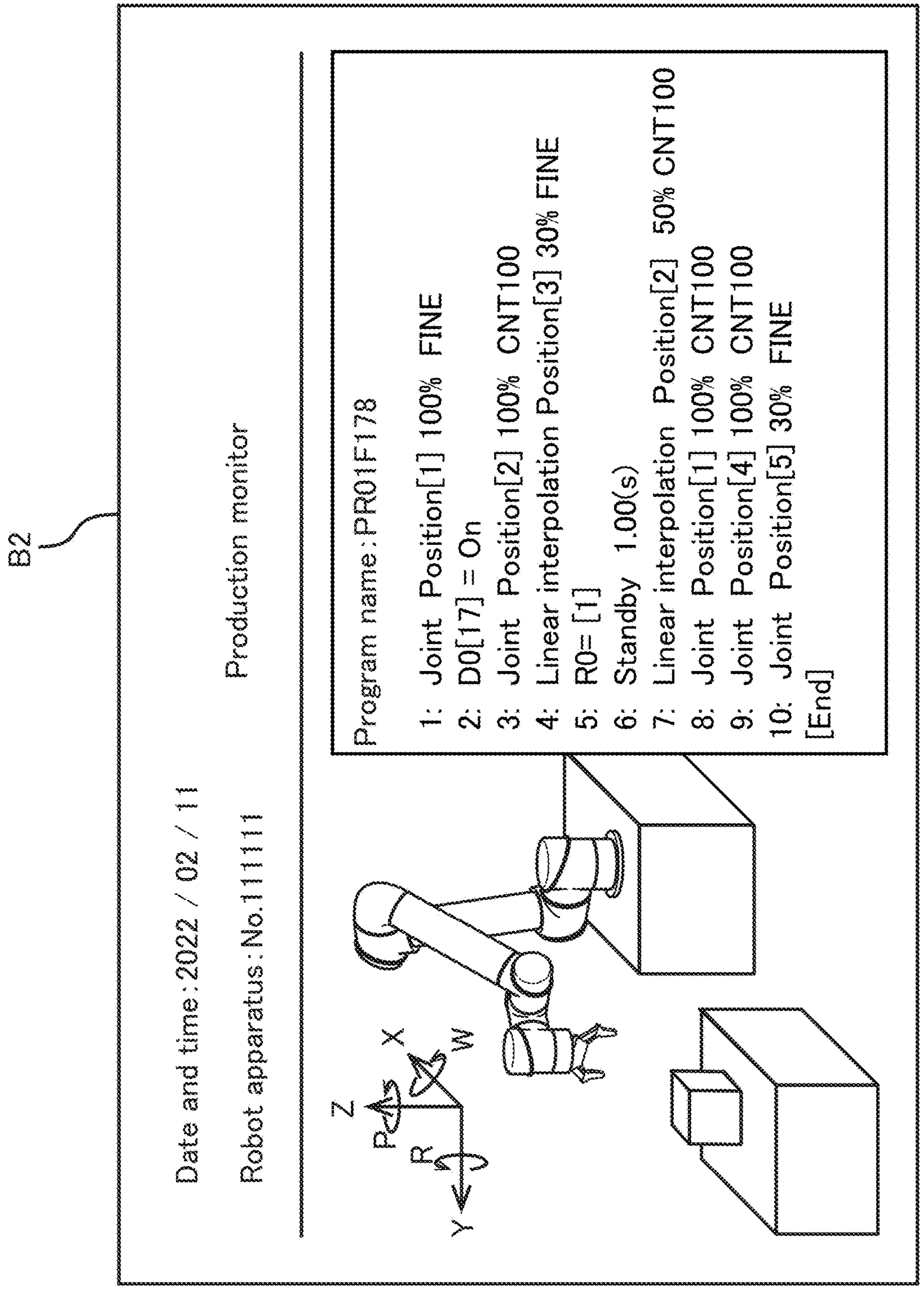
FIG. 6 shows a state in which a web page B2 in FIG. 3 is displayed on the teach pendant.

In the present embodiment, two image data files stored for the same web page are simply compared with each other to determine whether or not there is a difference. However, as shown in FIG. 4 to FIG. 6, the web page may include a text or an image whose display content, such as a date and time, changes. From the viewpoint of reducing the amount of work for visual checking by the operator, the range that shows, for example, a date and time, which is known to change on the web page, should be excluded from the comparison process. Therefore, it is desirable that the teach pendant 30 has a function of receiving in advance from the operator a range on the displayed web page where the comparison process is not to be executed.

In the present embodiment, the save folder is stored in the teach pendant 30. However, since the teach pendant 30 connected to the controller 10 may be changed, it is preferable that the save folder is also stored in at least one of the controller 10 and an external save device. Of course, the save folder may be stored in an external storage device such as a USB memory stick or a server device.

In the present embodiment, the screen saving process is started in accordance with the operator's instruction. However, the screen saving process may be automatically executed at any timing. For example, the screen saving process is automatically executed before or after a backup execution instruction is received, before or after update of software, an OS, or the like is executed in at least one of the controller 10 and the teach pendant 30, or the like. Of course, the screen saving process may be periodically executed at predetermined intervals such as one month. By configuring the screen saving process to be automatically executed, rather than depending on the operator's instruction, it is possible to avoid a situation in which an opportunity to save, as an image data file, a screen image when the web page constituting the control site is in a normal state is missed due to a sudden failure.

In the present embodiment, the teach pendant 30 identifies all the web pages constituting the control site by following the hyperlinks on the top page of the control site. However, assuming that the URLs of the web pages of the control site are not changed, a new web page is not added to the control site, and none of the plurality of web pages constituting the control site is deleted, the teach pendant 30 may hold in advance the URL information of all the web pages constituting the control site instead of following the hyperlinks to identify all the web pages constituting the control site each time the screen saving process is executed. Of course, since the above preconditions may be overthrown, from the viewpoint of reliability, it is more advantageous to identify all web pages constituting the control site by following the hyperlinks each time the screen saving process is executed.

In the first embodiment, an example has been described in which a browser is installed in the teach pendant 30 and an information screen provided from the controller 10 to the teach pendant 30 is provided as a web page, but the information screen may be provided in other formats. Hereinafter, a robot system according to a second embodiment will be described with reference to FIG. 11 to FIG. 18. The main difference between the first embodiment and the second embodiment lies in the format of the information screen provided from the controller 10 to the teach pendant 30. Therefore, in the description of the second embodiment, this difference will be mainly described.

In the storage device 14 of the controller 10, data of a plurality of information screens created on a provider's proprietary platform is stored in place of information relating to the control site. The data of each information screen is associated with a unique identifier for identifying the information screen. Of course, the name of the data file of the information screen may be the identifier. The identifier is a unique character string that does not duplicate the identifiers of the other identifiers. The information screen corresponds to the web page in the first embodiment, and the identifier corresponds to the URL in the first embodiment. The source file of the information screen includes a screen process for transitioning to another information screen. The screen process includes an identifier of the transition destination information screen.

Figure 12:
FIG. 12 shows an initial screen of a teach pendant of the robot system according to the second embodiment.
Figure 13:
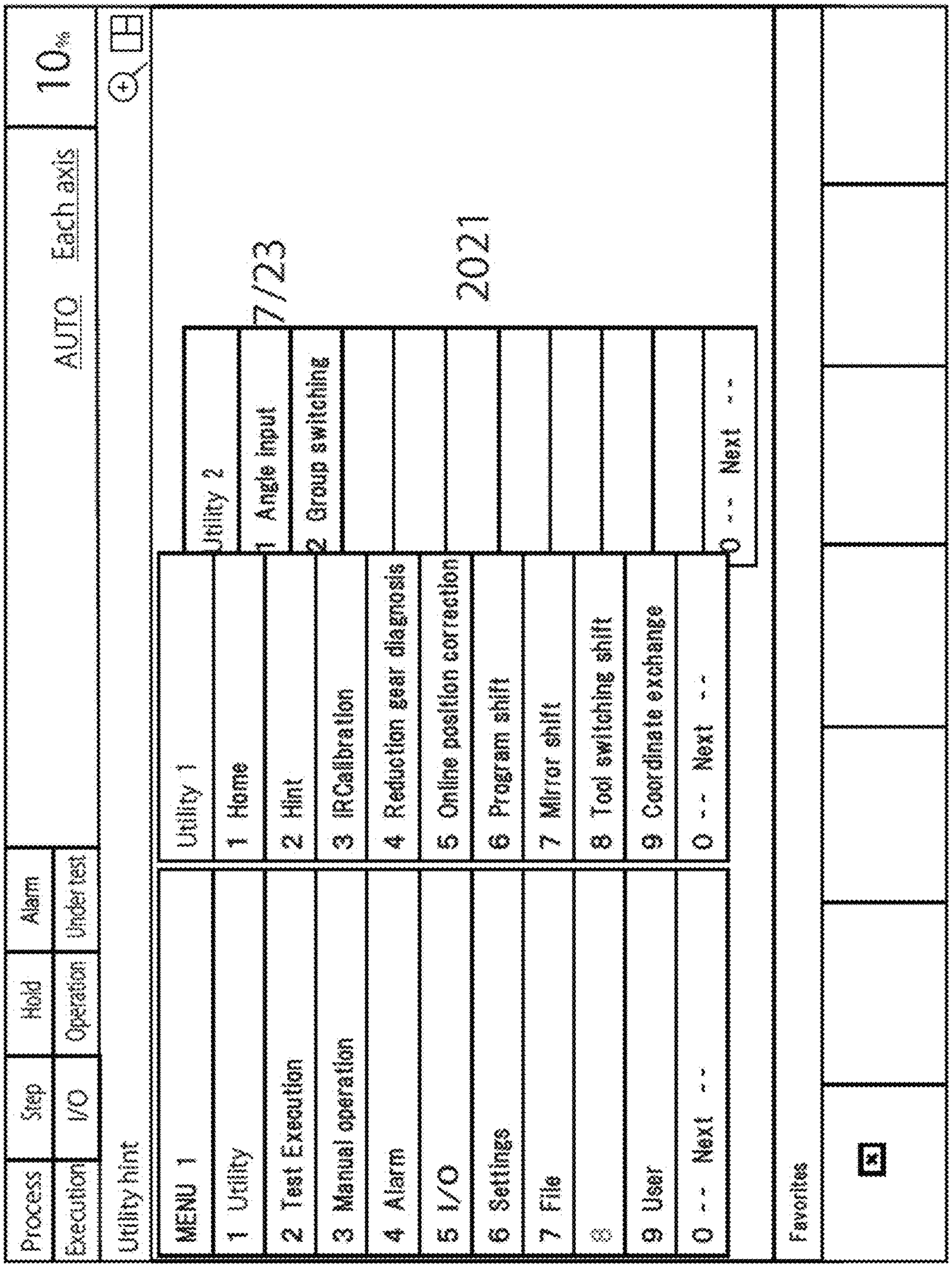
FIG. 13 shows a top menu displayed on the teach pendant by a specific operation on the initial screen shown in FIG. 12.
Figure 14:
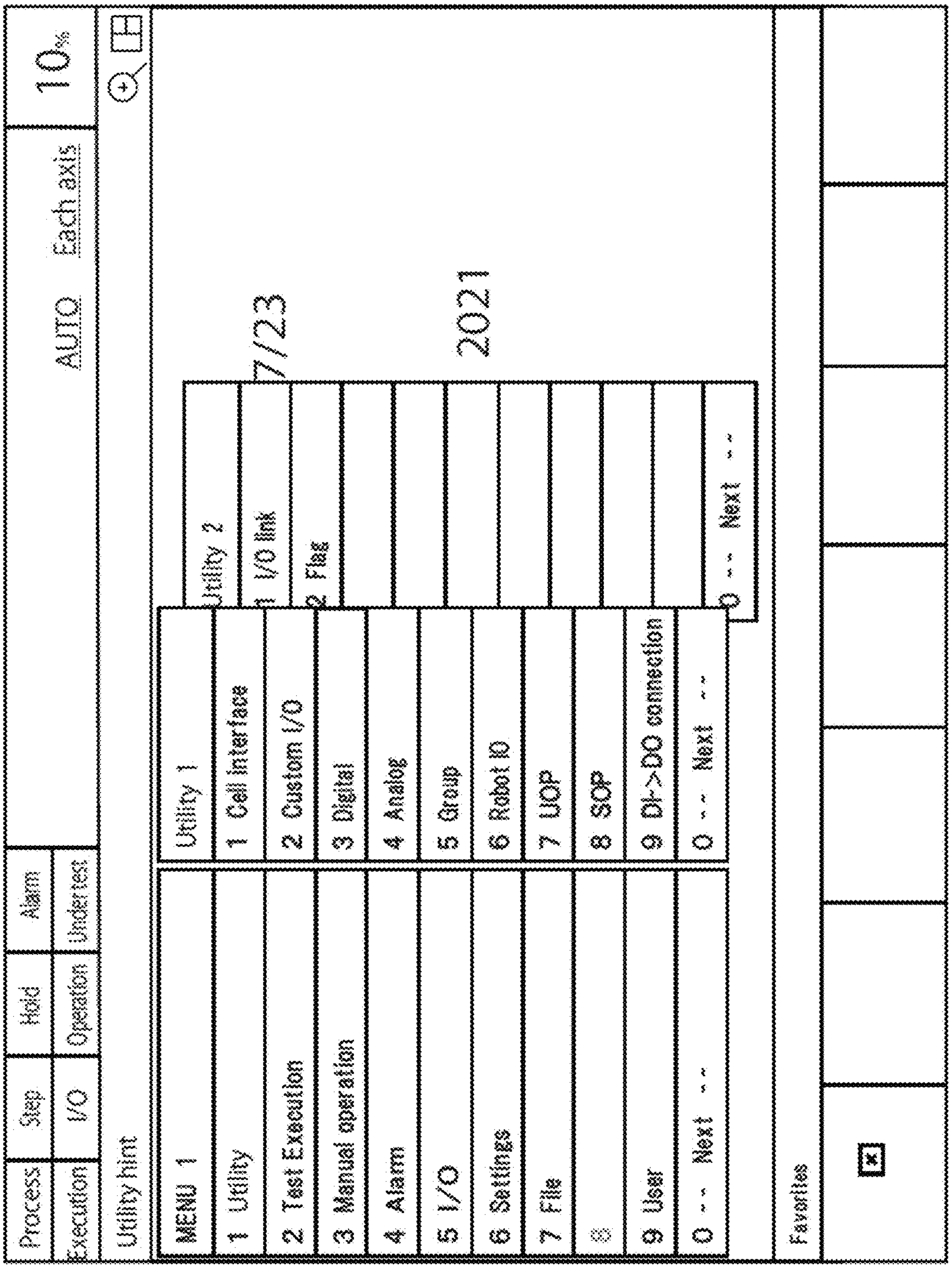
FIG. 14 shows a state in which a specific menu is selected in the top menu shown in FIG. 13.
Figure 15:
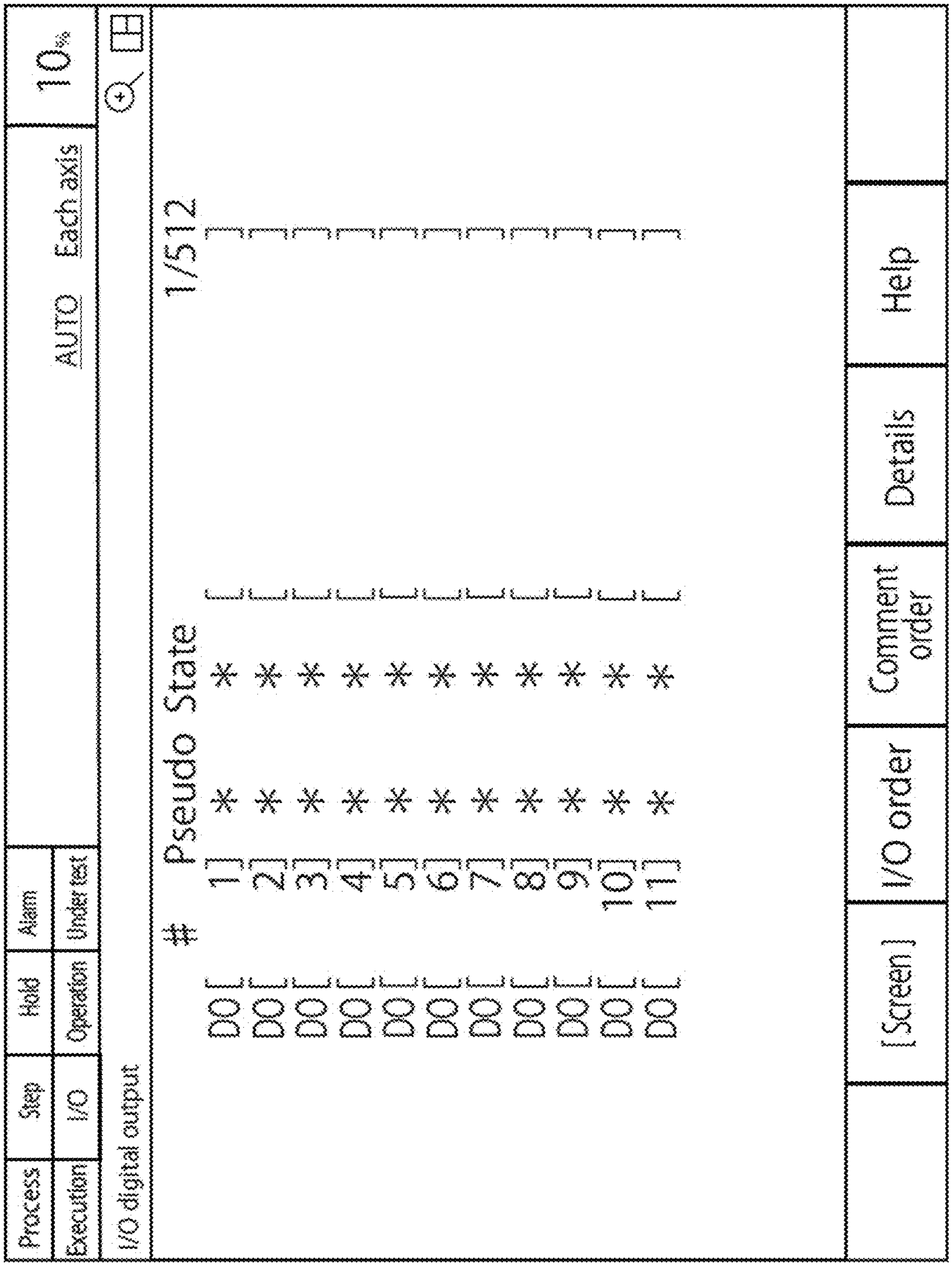
FIG. 15 shows an information screen transitioned to when a specific menu is selected in FIG. 14.
Figure 16:
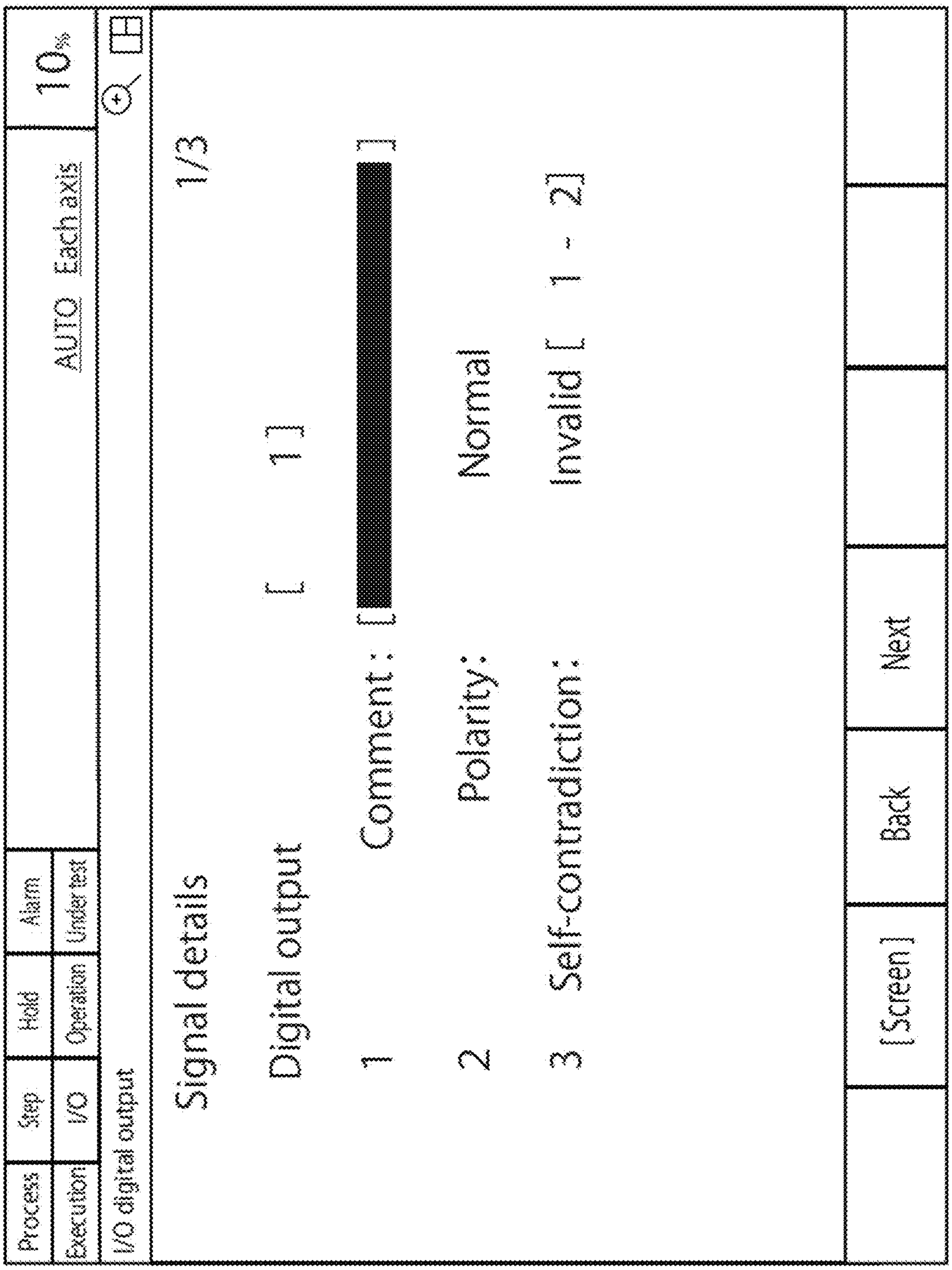
FIG. 16 shows an example an information screen transitioned to from the information screen shown in FIG. 15.
Figure 17:
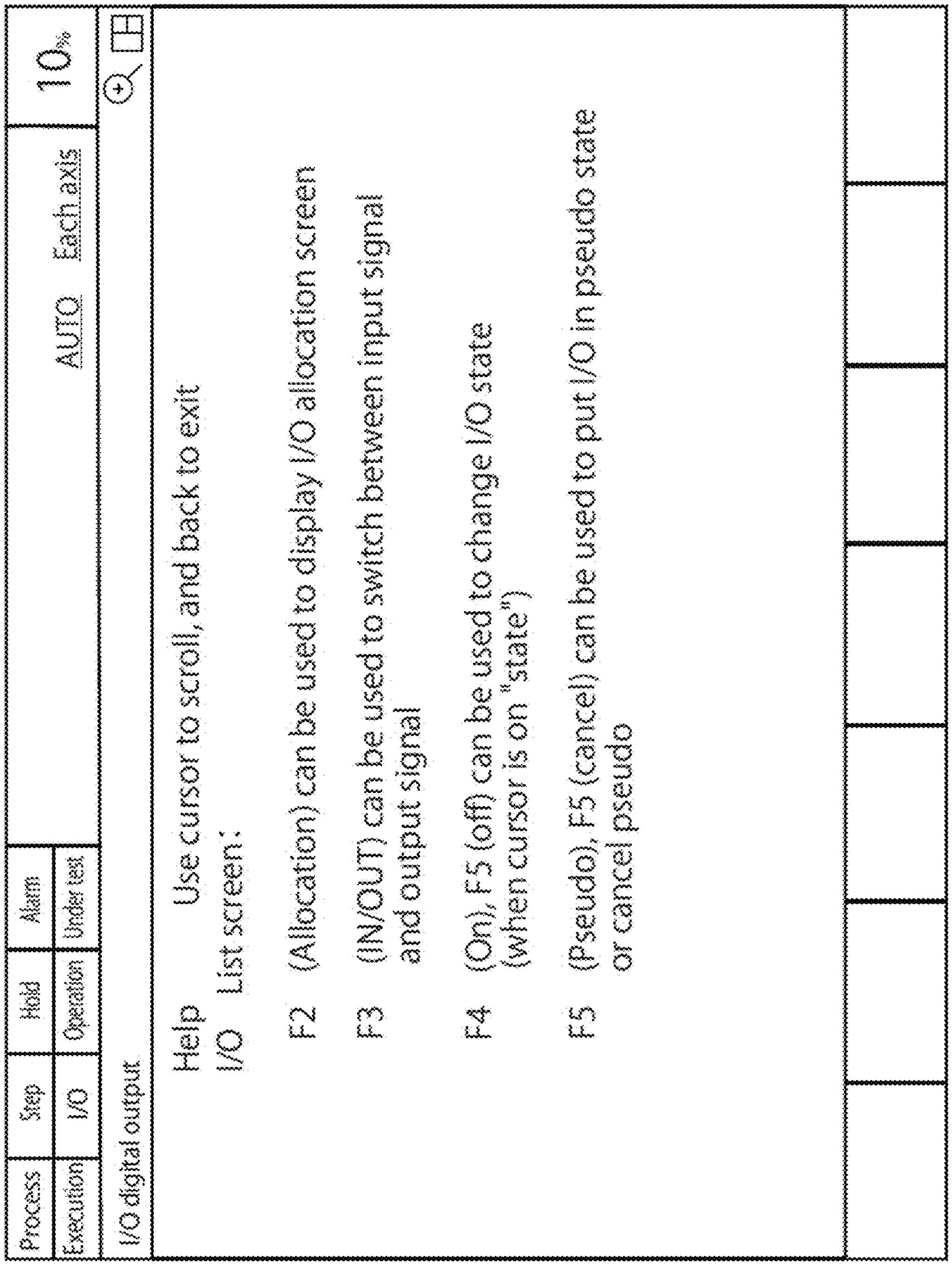
FIG. 17 shows another example of the information screen transitioned to from the information screen shown in FIG. 15.

FIG. 12 shows an initial screen displayed on the teach pendant 30. When, with the initial screen shown in FIG. 12 displayed, a specific key of an operation device 36 provided in the teach pendant 30 is pressed or a "screen" button on an initial screen is touched, the display device 37 of the teach pendant 30 displays the top menu of a series of information screens relating to control of the robot as shown in FIG. 13. The top menu is a so-called pop-up menu that is displayed in an overlapping manner to cover the currently displayed screen. As shown in FIG. 14, when "I/O" and "digital" are sequentially selected and determined on the top menu, the display transitions to an "I/O digital output screen" as shown in FIG. 15. When, with the "I/O digital output screen" of FIG. 15 displayed, a specific key of the operation device 36 provided in the teach pendant 30 is pressed or a "details" button on the initial screen is touched, the display transitions to the "signal details screen" as shown in FIG. 16. When, a specific key of the operation device 36 provided in the teach pendant 30 is pressed or a "help" button on the initial screen is touched with the "I/O digital output screen" of FIG. 15 displayed, the display transitions to the "help screen" as shown in FIG. 17.

Figure 11:
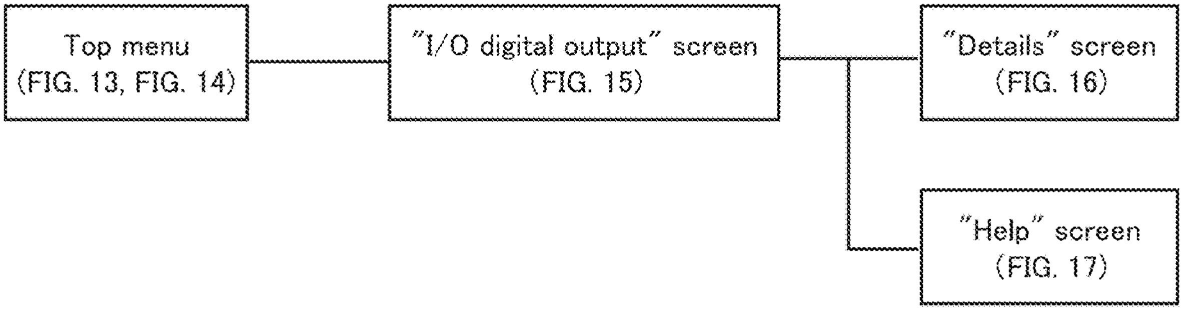
FIG. 11 shows a hierarchical structure of a plurality of information screens saved in a controller of a robot system according to a second embodiment.

In this manner, the screen displayed on the display device 37 can be transitioned to all of the plurality of information screens by an operation on the top menu shown in FIG. 14 and an operation on the "I/O digital output screen" shown in FIG. 15. The relationship among the plurality of information screens shown in FIG. 14 to FIG. 17 can be represented as a tree structure with the top menu as the "root" as shown in FIG. 11.

The transition of the screen is achieved by a "screen process" of rendering software of the information screen installed in the teach pendant 30. The screen process is a process of rendering and controlling an information screen corresponding to an item selected on each information screen. Specifically, the rendering software renders an information screen on the display device 37 of the teach pendant 30 using text data and image data provided from the controller 10. The content to be rendered by the screen process is determined by any one or combination of the following. The rendering software displays the determined rendering contents on the display device 37 without processing or after processing.

- Fixed contents determined in advance when the software was created.
- Contents of a specific file stored in advance in the controller 10 and the teach pendant 30
- Contents of data loaded on the memory 12 of the controller 10
- Contents of data obtained by communicating with peripheral devices connected to the controller 10

The screen process is executed by performing a specific key operation of the operation device 36 of the teach pendant 30, performing a specific touch operation on the display device 37 of the teach pendant 30, or performing a combination operation of a key operation and a touch operation while a specific information screen is displayed.

The specific key operation includes one or a combination of the following.

- One key of the operation device 36 is pressed one or more times in succession.
- A plurality of keys of the operating device 36 are pressed in a specific order.

The specific touch operation includes one or a combination of the following.

- A specific point on the display device 37, which is constituted by a touch panel, is touched one or more times in succession.
- A plurality of points on the display device 37, which is constituted by a touch panel, are touched in a specific order.

Figure 18:
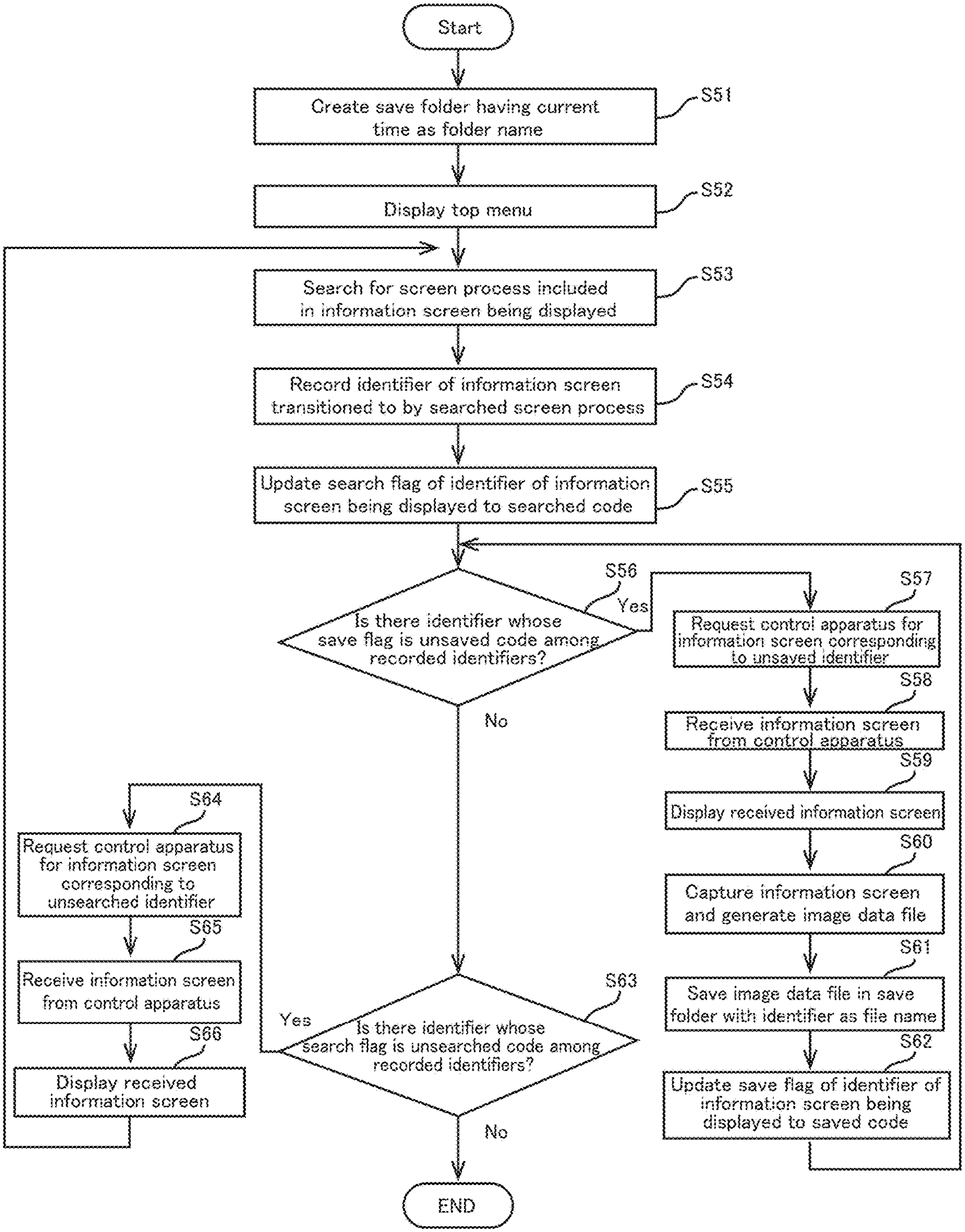
FIG. 18 is a flowchart showing a general procedure of a screen saving process executed in the teach pendant of the robot system according to the second embodiment.

In the first embodiment, all the web pages constituting the control site can be identified by repeating the search for a hyperlink included in the web page displayed on the display device 37 and the display of the web page corresponding to the URL referred to by the hyperlink identified by the search. An image saving process in a second embodiment will be described below with reference to FIG. 18. As shown in FIG. 18, the screen saving process in the second embodiment is the same as the screen saving process in the first embodiment described with reference to FIG. 8, except that the "URL" is replaced with an "identifier" and the "web page" is replaced with an "information screen". Therefore, FIG. 18 will be briefly described.

That is, as shown in FIG. 18, when the screen saving process is started, the teach pendant 30 creates a save folder (S51) and displays a top menu (S52). A source file of the information screen being displayed is searched for (S53), a screen process for transition from the information screen being displayed to another information screen is extracted, and an identifier of the information screen transitioned to by the extracted screen process is recorded (S54). The search flag of the identifier of the information screen being displayed is updated to the searched code, which indicates that the search has been completed (S55).

Next, the teach pendant 30 identifies an identifier whose save flag is an unsaved code among the identifiers recorded in step S54, requests the controller 10 to provide an information screen corresponding to the identified identifier (S57), receives the requested information screen from the controller 10 (S58), and displays the received information screen (S59). Then, the displayed information screen is captured, an image data file having a predetermined format is created (S60), and the created image data file is saved in the save folder (S61). The teach pendant 30 updates the save flag of the identifier corresponding to the information screen being displayed to the saved code (S62).

The processes of step S57 to step S62 are repeatedly executed until the save flags of all the identifiers recorded in step S54 are updated to the saved code (S56; Yes). When the save flags of all the identifiers recorded in step S54 are updated to the saved code (S56; No), the teach pendant 30 requests the controller 10 to provide an information screen corresponding to the identifier whose search flag is the unsearched code among the identifiers recorded in step S54 (S64), receives the requested information screen from the controller 10 (S65), and displays the received information screen (S66). Then, the processing is returned to step S53, and the extraction of a screen process included in the source file of the information screen being displayed, the recording of the identifier transitioned to by the screen process, the capturing process of the information screens corresponding to all the newly recorded identifiers, and the saving process of the captured image data files are sequentially executed. The processes of step S54 to step S62 and the processes of step S64 to step S66 are repeatedly executed until the save flags of all the identifiers newly recorded in step S54 are updated to the saved code and the search flags are updated to the searched code (S63; Yes). When the save flags of all the identifiers recorded in step S54 have been updated to the saved code and the search flags have been updated to the searched code (S63; No), the screen saving process is completed.

According to the screen saving process of the second embodiment described with reference to FIG. 18, as in the screen saving process of the first embodiment, it is possible to obtain image data files corresponding to all the information screens (web pages of the first embodiment and information screens of the second embodiment) provided by the control software and displayed on the teach pendant 30. The robot system according to the second embodiment described above has the same effects as the robot system according to the first embodiment.

In the screen saving processes of the first and second embodiments, when the top page (top menu) is the first tier, the saving process of the information screens included in the second tier below the first tier is executed, and then the saving process of the information screens included in the third tier below the second tier is executed. That is, the saving process of the information screens is executed in order from the upper tier. However, as long as all information screens can be saved, the method is not limited to the first and second embodiments.

For example, when the top page of an information screen having a tree structure is a root node, an information screen to be transitioned to another information screen is a branch node, and an information screen not to be transitioned to another information screen is a leaf node, the screen saving process may be sequentially executed from the root node toward a leaf node, and when the leaf node is reached, the screen saving process may be sequentially executed again from the root node toward another leaf node.

Although several embodiments of the present invention have been described, these embodiments are presented by way of example and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot system, comprising:
- a robot;
- a controller configured to control operation of the robot based on control information relating to a motion of the robot; and
- a teach pendant connected to the controller, wherein the controller includes:
- a memory storing the control information, and
- at least one processor configured to
  - generate screen data representing the control information, and
  - transmit the screen data to the teach pendant, the teach pendant includes:
- a display device,
- a storage unit configured to
  - capture, as a captured screen image, a screen displaying the control information, and
  - store the captured screen image as an image data file together with a timestamp, and
- at least one processor configured to;
  - cause the display device to display the screen data representing the control information received from the controller,
  - read, from the storage unit, a first image data file and a second image data file having different timestamps,
  - cause the display device to display the first and second image data files side by side,
  - identify, from each of the first and second image data files, a plurality of control-information items corresponding to the operation of the robot,
  - perform an item-by-item comparison of the plurality of control-information items identified from the first image data file with the plurality of control-information items identified from the second image data file on an item-by-item basis,
  - detect, based on the item-by-item comparison, a changed portion of the control information relating to the operation of the robot, and
  - cause the display device to visually distinguish the changed portion from an unchanged portion in at least one of the first and second image data files.

2. The robot system according to claim 1, wherein the at least one processor of the teach pendant is configured to extract the changed portion between the first and second image data files.

3. The robot system according to claim 1, wherein the at least one processor of the teach pendant is configured to compare the first and second image data files excluding a predetermined data of the first and second image data files.

4. The robot system according to claim 3, wherein the predetermined data includes a date and time of the first and second image data files.

5. The robot system according to claim 4, wherein the screen includes a link to another screen, and the teach pendant is configured to
- follow the link, and
- cause the display device to display the another screen.

6. A teach pendant connected to a controller of a robot, the teach pendant comprising:
- a display device;
- a storage unit configured to
  - capture, as a captured screen image, a screen displaying control information relating to operation of the robot received from the controller and to
  - store the captured screen image as an image data file together with a timestamp; and
- at least one processor configured to;
  - cause the display device to display screen data representing the control information received from the controller,
  - read, from the storage unit, a first image data file and a second image data file having different timestamps,
  - cause the display device to display the first and second image data files side by side,
  - identify, from each of the first and second image data files, a plurality of control-information items corresponding to the operation of the robot,
  - perform an item-by-item comparison of the plurality of control-information items identified from the first image data file with the plurality of control-information items identified from the second image data file on an item-by-item basis,
  - detect, based on the item-by-item comparison, a changed portion of the control information relating to operation of the robot, and
  - cause the display device to visually distinguish the changed portion from an unchanged portion in at least one of the first and second image data files.

7. A non-transitory storage medium storing a program for causing a computer connected to a controller of a robot to:
- receive screen data representing control information relating to operation of the robot from the controller;
- cause a display device to display the screen data representing the control information;
- capture, as a captured screen image, a screen displaying the control information;
- store the captured screen image as an image data file together with a timestamp;
- read a first image data file and a second image data file having different timestamps;
- cause the display device to display the first and second image data files side by side;
- identify, from each of the first and second image data files, a plurality of control-information items corresponding to the operation of the robot;
- perform an item-by-item comparison of the plurality of control-information items identified from the first image data file with the plurality of control-information items identified from the second image data file on an item-by-item basis;
- detect, based on the item-by-item comparison, a changed portion of the control information relating to the operation of the robot; and
- cause the display device to visually distinguish the changed portion from an unchanged portion in at least one of the first and second image data files.

* * * * *